(12) United States Patent
Huang et al.

(10) Patent No.: US 11,789,509 B2
(45) Date of Patent: Oct. 17, 2023

(54) POWER-ON SEQUENCE FOR A POWER SUPPLY SYSTEM

(71) Applicant: Nuvoton Technology Corporation, Hsinchu Science Park (TW)

(72) Inventors: Chun-Ming Huang, Taoyuan (TW); Chieh-Sheng Tu, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/475,797

(22) Filed: Sep. 15, 2021

(65) Prior Publication Data
US 2022/0334627 A1    Oct. 20, 2022

(30) Foreign Application Priority Data

Apr. 14, 2021    (TW) .................... 110113391

(51) Int. Cl.
*G06F 1/26*    (2006.01)
*G06F 13/40*    (2006.01)
*G06F 1/18*    (2006.01)

(52) U.S. Cl.
CPC .............. *G06F 1/26* (2013.01); *G06F 13/40* (2013.01); *G06F 1/189* (2013.01); *G06F 1/266* (2013.01)

(58) Field of Classification Search
CPC . G06F 1/26; G06F 1/266; G06F 1/189; G06F 13/40
USPC ........................... 713/300, 310, 330
See application file for complete search history.

(56) References Cited

U.S. PATENT DOCUMENTS

| 6,069,832 | A | * | 5/2000 | Ma | G11C 11/4074 365/194 |
| 7,475,267 | B1 | * | 1/2009 | Cocosel | G06F 1/305 713/340 |
| 2003/0237008 | A1 | * | 12/2003 | Freevol | G06F 1/329 713/300 |
| 2004/0095667 | A1 | * | 5/2004 | Jain | G11B 19/00 |
| 2012/0159208 | A1 | * | 6/2012 | Intrater | G06F 1/3268 713/320 |

(Continued)

FOREIGN PATENT DOCUMENTS

| CN | 109326067 A | 2/2019 |
| CN | 212163776 U | 12/2020 |
| TW | M458710 U | 8/2013 |

OTHER PUBLICATIONS

Taiwan Office Action with Search Report cited in counterpart application No. 110113391, dated Jan. 6, 2022, 5 pages.

*Primary Examiner* — Ji H Bae
(74) *Attorney, Agent, or Firm* — Muncy, Geissler, Olds & Lowe, P.C.

(57) ABSTRACT

An electronic device is provided. The electronic device includes a power pin, a main circuit, and a start-up circuit. The power pin is configured to receive a power supply. The start-up circuit includes a switch coupled between the power pin and the main circuit, a timer and an oscillator. The switch is configured to selectively provide the power supply to the main circuit in response to a control signal. The oscillator, is configured to provide a periodic signal. The timer is configured to provide the control signal to turn on the switch when counting to a start-up time according to the periodic signal, so that the main circuit is configured to provide a fixed voltage according to the power supply.

14 Claims, 3 Drawing Sheets

(56) References Cited

U.S. PATENT DOCUMENTS

2013/0238911 A1* 9/2013 Tian .................. G06F 1/26
  713/300
2014/0032942 A1 1/2014 Takehara et al.

* cited by examiner

POWER-ON SEQUENCE FOR A POWER SUPPLY SYSTEM

CROSS REFERENCE TO RELATED APPLICATIONS

This application claims priority of Taiwan Patent Application No. 110113391, filed on Apr. 14, 2021, the entirety of which is incorporated by reference herein.

BACKGROUND OF THE INVENTION

Field of the Invention

The invention relates to a power supply system, and more particularly to power-on sequence for a power supply system.

Description of the Related Art

A bus power supply system is a common power supply system with a master-slave architecture. In addition to the communication between a master device (also called a master node) and the slave devices (also called slave nodes) through the bus, the master device usually also provides power to the bus, so that the slave devices can obtain power through the bus to operate. In the bus power supply system, the slave devices do not need to be equipped with additional batteries or additional power supply wiring, so the complexity of the wiring and the cost of the system configuration are reduced.

The bus power supply system can be applied to a remote measurement system. In a remote measurement system, the master device can obtain measurement values from multiple measuring devices. Generally speaking, the measuring devices (such as electricity meters, gas meters, water meters, etc.) are usually far away. For example, they may be distributed in different buildings or on different floors. It may cause the voltage drop of the measuring devices.

BRIEF SUMMARY OF THE INVENTION

Electronic devices and a power supply system are provided. An embodiment of an electronic device is provided. The electronic device includes a power pin, a main circuit, and a start-up circuit. The power pin is configured to receive a power supply. The start-up circuit includes a switch coupled between the power pin and a main circuit, a timer and an oscillator. The switch is configured to selectively provide the power supply to the main circuit in response to a control signal. The oscillator is configured to provide a periodic signal. The timer is configured to provide the control signal to turn on the switch when counting to a start-up time according to the periodic signal, so that the main circuit is configured to provide a fixed voltage according to the power supply.

Moreover, an embodiment of a power supply system is provided. The power supply system includes a first electronic device, a power line and a plurality of second electronic devices coupled to the first electronic device through the power line. The power line is configured to transmit a power supply from the first electronic component. Each of the second electronic devices includes a power pin coupled to the power line, a main circuit, and a start-up circuit. The power pin is configured to receive the power supply. The main circuit includes a functional circuit and a voltage regulator. The voltage regulator is configured to provide at least one fixed voltage to power the functional circuit. The start-up circuit includes a switch coupled between the power pin and the voltage regulator and a timer. The timer is configured to count a start-up time. When the timer counts to the start-up time, the timer is configured to provide a control signal to the switch to turn on the switch, so that the voltage regulator is configured to provide the fixed voltage according to the power supply of the power line. The start-up time of the second electronic devices are different.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
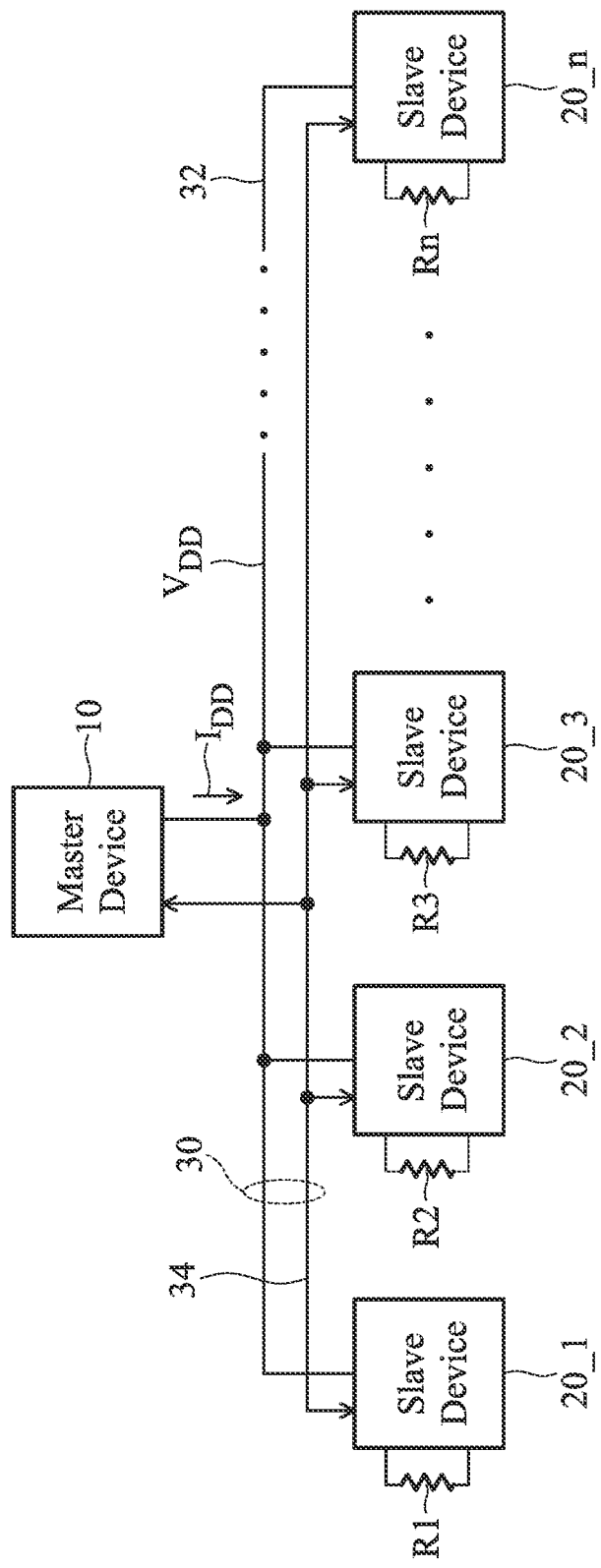
FIG. 1 shows a bus power supply system according to some embodiments of the invention.

FIG. 1 shows a bus power supply system 100 according to some embodiments of the invention. The bus power supply system 100 includes a master device 10, a plurality of slave devices 20_1-20_n and a bus (or a busbar) 30. Each of the slave devices 20_1 through 20_n is coupled to the master device 10 through the bus 30. In the bus power supply system 100, the distances from the master device 10 to the slave devices 20_1 through 20_n are different. In addition, the slave devices 20_1 through 20_n are respectively coupled to the corresponding resistors R1 through Rn. For example, the slave device 201 is coupled to the resistor R1, the slave device 20_2 is coupled to the resistor R2, and the slave device 20_3 is coupled to the resistor R3, and so on. In some embodiments, the distances from the master device 10 to the slave devices 20_1 through 20_n are the same. In some embodiments, the master device 10 is an electronic device located at the power supply end, and the slave devices 20_1 through 20_n are electronic devices located at the power receiving end. In some embodiments, the master device 10 and the slave devices 20_1 through 20_n may be the integrated circuits (ICs).

In FIG. 1, the bus 30 includes at least one power line 32 and at least one signal line 34. In some embodiments, the bus 30 may be a meter bus (M-bus) or a power bus. The master device 10 is configured to provide a power supply $V_{DD}$ through the power line 32 to supply power to the slave devices 20_1 through 20_n. It should be noted that when the master device 10 provides the power supply $V_{DD}$ to power the slave devices 20_1 through 20_n, the slave devices 20_1 through 20_n will start up at different times. In other words, in the bus power supply system 100, the slave devices 20_1 through 20_n will not be activated at the same time. In some embodiments, the resistors R1 through Rn have different impedances, and the start-up time of the slave devices 20_1 through 20_n are determined by the corresponding resistors R1 through Rn. In some embodiments, the resistors R1 through Rn may be other types of impedance devices, such as capacitors and inductors. In addition, the master device 10 is configured to communicate with the slave devices 20_1 through 20_n via the signal line 34, so as to perform data exchange. For example, in a fire bus system, after the master device 10 issues an inquiry (or instruction), the slave devices 20_1 through 20_n are configured to provide fire detection data to the master device 10 through the signal line 34.

In some embodiments, the bus power supply system 100 is a fire bus system, an electronic detonator bus system, a water meter bus system, and the like. The master device 10 may be a controller or a processor. In some embodiments, the slave devices 20_1 through 20_n may be the same type of electronic devices, for example, the slave devices 20_1 through 20_n are all fire-fighting sensors. In some embodiments, the slave devices 20_1 through 20_n may be different types of electronic devices, for example, the slave device 20_1 is a fire-fighting sensor, and the slave device 20_2 is a utility meter.

Figure 2:
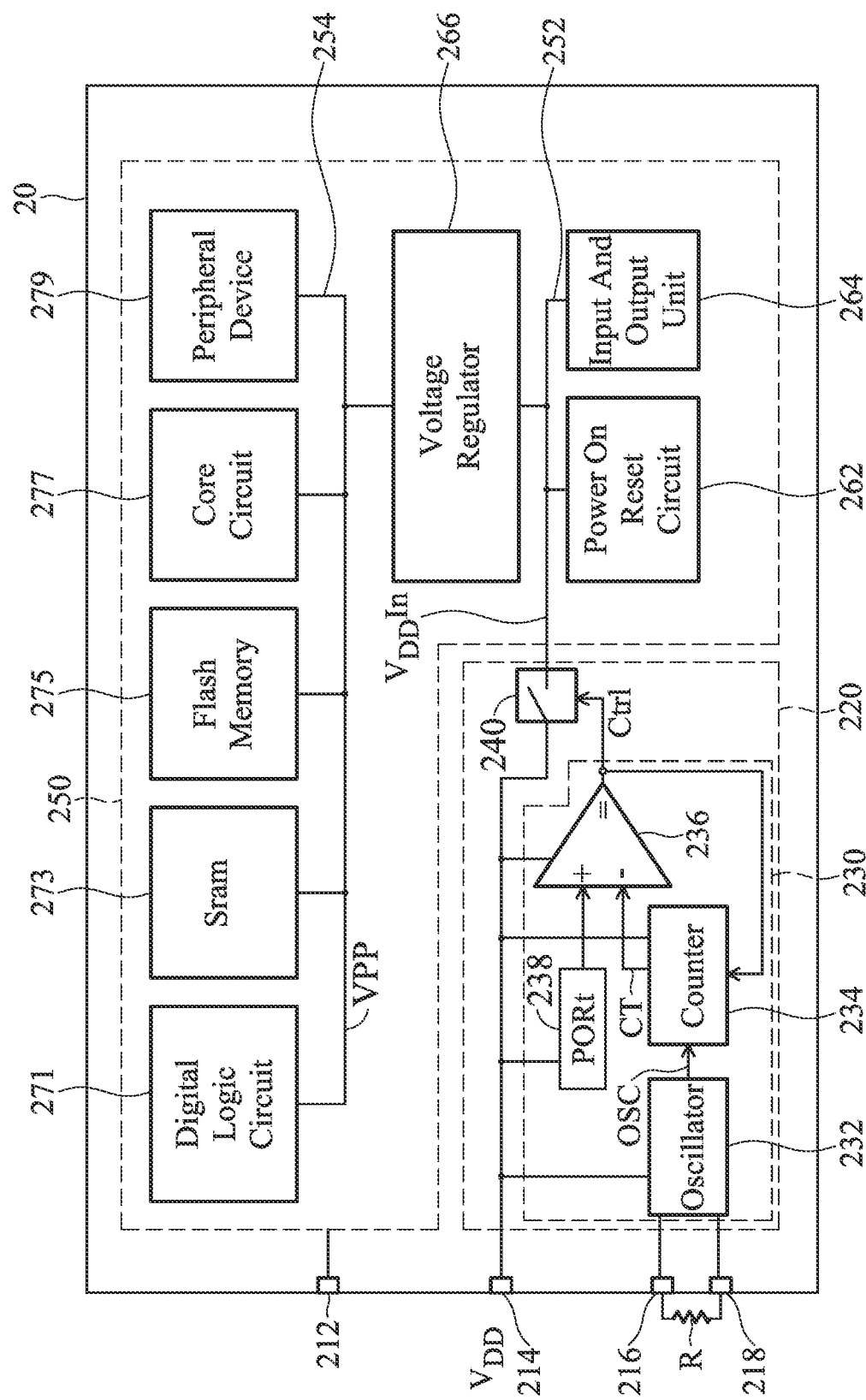
FIG. 2 shows an electronic device according to some embodiments of the invention.

FIG. 2 shows an electronic device 20 according to some embodiments of the invention. In some embodiments, the electronic device 20 may be an integrated circuit (IC) that can be implemented as the slave devices 20_1 through 20_n of FIG. 1. Referring to FIGS. 1 and 2 together, the electronic device 20 includes a start-up circuit 220 and a main circuit 250. The electronic device 20 has the pins 212 through 218. The pin 212 is a signal pin and is coupled to the signal line 34 of the bus 30. The main circuit 250 is configured to communicate with the master device 10 on the signal line 34 through the pin 212. The pin 214 is a power pin and is coupled to the power line 32 of the bus 30. The pins 216 and 218 are oscillation pins, wherein the pin 216 is coupled to the first terminal of the resistor R, and the pin 216 is coupled to the second terminal of the resistor R. In FIG. 2, in order to simplify the description, only the pins related to power supply are shown and other pins, such as ground pins, are omitted.

The start-up circuit 220 includes a timer 230 and a switch 240. The timer 230 is coupled to the external resistor R through the pins 216 and 218. Moreover, the timer 230 includes an oscillator 232, a counter 234, a comparator 236, and a storage 238. The oscillator 232 is a resistance-capacitance oscillator (RC oscillator), and is coupled in parallel with the external resistor R through the pins 216 and 218. When the master device 10 provides the power supply $V_{DD}$ through the power line 32, the power supply $V_{DD}$ is provided to the start-up circuit 220 through the pin 214, so as to supply power to the oscillator 232, the counter 234, the storage 238, and the comparator 236. After the oscillator 232 is powered by the power supply $V_{DD}$, the oscillator 232 combines with the external resistor R to provide a periodic signal OSC to the counter 234, and the frequency of the periodic signal OSC is determined by the impedance of the external resistor R. In some embodiments, the periodic signal OSC is a sine wave signal. The counter 234 is configured to count the periodic signal OSC and to obtain the counting result CT. Next, the comparator 236 is configured to compare the counting result CT with the start-up time setting value PORt pre-stored in the storage 238, so as to provide a control signal Ctrl to the switch 240. When the counting result CT has not reached the start-up time setting value PORt, i.e., CT<PORt, the comparator 236 is configured to provide the control signal Ctrl with a first logic level to a control terminal of the switch 240, so as to turn off the switch 240 (i.e., OFF). In addition, when the counting result CT is equal to the start-up time setting value PORt, i.e., CT=PORt, the comparator 236 is configured to provide the control signal Ctrl with a second logic level to the control terminal of the switch 240, so as to turn on the switch 240 (i.e., ON). The second logic level (e.g., the high logic level H) is complementary to the first logic level (e.g., the low logic level L). In some embodiments, in response to the control signal Ctrl with the second logic level, the counter 234 is configured to stop counting the periodic signal OSC.

In the start-up circuit 220, the switch 240 is a power switch. In response to the control signal Ctrl, the switch 240 is configured to selectively provide the power supply $V_{DD}$ to the main circuit 250. For example, when the control signal Ctrl controls the switch 240 to turn off, the power supply $V_{DD}$ from the pin 214 is not be transmitted to the main circuit 250, that is, the main circuit 250 will not be powered on. Conversely, when the control signal Ctrl controls the switch 240 to turn on, the power supply $V_{DD}$ from the pin 214 is transmitted to the power line 252 of the main circuit 250 as the internal power $V_{DD}$In.

The power line 252 of the main circuit 250 is coupled to the switch 240 and the power on reset (POR) circuit 262, the input and output unit 264, and the voltage regulator 266. After the power $V_{DD}$In is provided to the voltage regulator 266, the voltage regulator 266 is configured to provide a fixed voltage VPP to power the functional circuits through the power line 254, and one or more sub-circuits with different functions can be configured as required, such as the digital logic circuit 271, the SRAM 273, the flash memory 275, the core circuit 277, and the peripheral device 279. After the digital logic circuit 271, the SRAM 273, the flash memory 275, the core circuit 277, and the peripheral device 279 are powered on, the main circuit 250 is configured to perform the initialization operation for starting the settings and operations of the core circuit 277 and the peripheral device 279, and to enter a power-saving mode after the initialization operation is completed, until an instruction from the master device 10 through the signal line 34 or a self-wake-up request (or interrupt) is received. As described above, after the master device 10 issues an inquiry (or command), the electronic device 20 is configured to provide measurement data to the master device 10 through the signal line 34.

In FIG. 2, the start-up time setting value PORt in the storage 238 is the start-up time set in advance by hardware. In some embodiments, the slave devices 20_1 through 20_n have the same start-up time setting value PORt. Thus, by adjusting the impedances of the external resistors R1 through Rn of the slave devices 201 through 20_n, the slave devices 20_1 through 20_n are configured to obtain the different frequencies of periodic signal OSC. Therefore, with different frequencies of the periodic signal OSC and the same start-up time setting value PORt, the slave devices 20_1 through 20_n are configured to respectively turn on the respective switches 240 at different start-up times.

In some embodiments, the slave devices 20_1 through 20_n have different start-up time setting values PORt. Furthermore, the external resistors R1 through Rn of the slave devices 201 through 20_n have the same impedance, and the slave devices 20_1 through 20_n are configured to obtain the periodic signal OSC of the same frequency. Therefore, with the same frequency of the periodic signal OSC and different start-up time setting values PORt, the slave devices 20_1 through 20_n are configured to respectively turn on the respective switches 240 at different start-up times.

Figure 3:
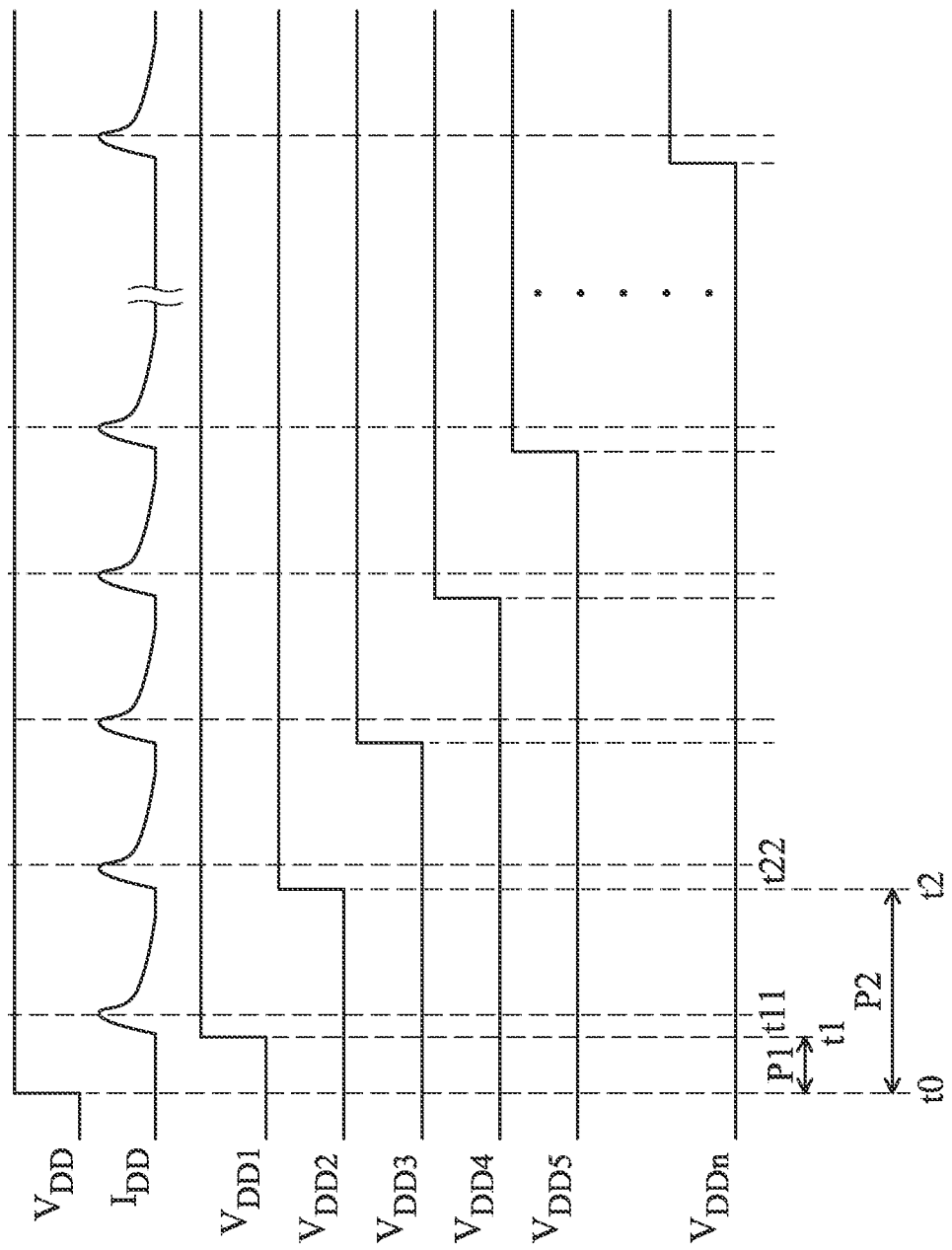
FIG. 3 shows a waveform diagram of power and current when the bus power supply system in FIG. 1 is powered on according to some embodiments of the invention.

FIG. 3 shows a waveform diagram of power and current when the bus power supply system 100 in FIG. 1 is powered on according to some embodiments of the invention. In FIG. 3, $V_{DD}$ represents the power supply $V_{DD}$ supplied by the master device 10 to the slave devices 20_1 through 20_$n$ through the power line 32 of the bus 30, and $I_{DD}$ represents the current drawn from the power line 32 by the slave devices 20_1 through 20_$n$. Moreover, $V_{DD1}$ represents the power $V_{DD}$In of the power line 252 in the slave device 20_1, $V_{DD2}$ represents the power $V_{DD}$In of the power line 252 in the slave device 202, and $V_{DD3}$ represents the power $V_{DD}$In of the power line 252 in the slave device 203, and so on.

At time t0, the master device 10 is configured to provide the power supply $V_{DD}$ to the slave devices 20_1 through 20_$n$ via the power line 32. Thus, the timer 230 of the start circuit 220 of each of the slave devices 20_1 through 20_$n$ is configured to count. Next, at time t1, the counting result CT corresponding to the resistance R1 and counted by the slave device 20_1 is the same as the start-up time setting value PORt (i.e., counting from the time t0 to the start-up time P1 of the slave device 20_1), so that the comparator 236 is configured to provide the control signal Ctrl to turn on the switch 240. Thus, the main circuit 250 of the slave device 20_1 is powered on and is configured to start the initialization operation, and the current $I_{DD}$ of the power line 32 in the bus 30 starts to rise. Since the increased current amount of the current IDD is still within the load capacity of the power supply $V_{DD}$, the voltage of the power supply $V_{DD}$ will not be pulled down, i.e., no large current resistance drop (IR drop) will be generated. At time t11, after the initialization operation is completed, the slave device 20_1 is configured to enter the power-saving mode, and the current $I_{DD}$ on the power line 32 starts to decrease.

Next, at time t2, the counting result CT corresponding to the resistance R2 and counted by the slave device 20_2 is the same as the start-up time setting value PORt (i.e., counting from the time point t0 to the start-up time P2 of the slave device 20_2), so that the comparator 236 is configured to provide a control signal Ctrl to turn on the switch 240. Thus, the main circuit 250 of the slave device 202 is powered on and is configured to start the initialization operation, and the current $I_{DD}$ of the power line 32 in the bus 30 starts to rise. Since the increased current amount of the current $I_{DD}$ is still within the load capacity of the power supply $V_{DD}$, the voltage of the power supply $V_{DD}$ will not be pulled down, that is, a large current resistance voltage drop will not be generated. At time t22, after the initialization operation is completed, the slave device 20_2 is configured to enter the power-saving mode, and the current $I_{DD}$ of the power line 32 starts to decrease. As shown in FIG. 3, the slave devices 20_1 through 20_$n$ can be scheduled to be powered on at different start-up times. Furthermore, in the embodiment, only one slave device is powered on at a time. In other embodiments, multiple slave devices are powered on at one time, and the number of slave devices that are powered on at the same time is determined according to different applications and the load capacity of the power supply $V_{DD}$. In some embodiments, the start-up time of the slave devices 201 through 20_$n$ (e.g., P1 and P2) are determined by the distances between the slave devices 20_1 through 20_$n$ and the master device 10.

In the traditional bus power supply system, the slave devices will start (power on) at the same time, so it is easy to cause the instantaneous load of the power supply $V_{DD}$ to be too large and cause the voltage to drop. Therefore, the power supply $V_{DD}$ with too low voltage will cause the remote slave device (the end slave node) cannot be activated. Compared with the traditional bus power supply system, the bus power supply system 100 in the embodiments can adjust the start-up time (power-on sequence) of each slave device by adjusting the impedance of the external resistor or the internal start-up time setting value PORt, so that the start-up time of the slave devices will not overlap. Therefore, the voltage drop of the power supply $V_{DD}$ is avoided, and each slave device can be activated. Moreover, in the bus power supply system 100, the master device 10 does not need to control the power-on sequence of the slave devices 20_1 through 20_$n$. Therefore, the control complexity of the bus power supply system 100 is reduced.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a power pin, receiving a power supply;
   a main circuit; and
   a start-up circuit, comprising:
      a switch coupled between the power pin and the main circuit, selectively providing the power supply to the main circuit in response to a control signal;
      an oscillator, providing a periodic signal; and
      a timer, providing the control signal to turn on the switch when counting to a start-up time according to the periodic signal, so that the main circuit is configured to provide a fixed voltage according to the power supply,
   wherein when no power supply is received by the power pin, the switch is turned off,
   wherein once the power supply is received by the power pin and the timer is powered by the power supply, the switch is turned off until the timer has counted to the start-up time.

2. The electronic device as claimed in claim 1, wherein the main circuit comprises:
   a function circuit; and
   a voltage regulator, providing the fixed voltage to power the function circuit.

3. The electronic device as claimed in claim 1, further comprising:
   a first pin; and
   a second pin,
   wherein the oscillator is coupled in parallel with an external impedance device through the first pin and the second pin, and the oscillator is configured to provide the periodic signal according to an impedance of the external impedance device.

4. The electronic device as claimed in claim 1, wherein the timer further comprises:
   a counter, receiving the periodic signal and counting to obtain a counting result based on the periodic signal; and
   a comparator, comparing the counting result with a setting value corresponding to the start-up time to provide the control signal.

5. The electronic device as claimed in claim 4, wherein when the counting result is less than the setting value, the comparator is configured to provide the control signal to the switch to turn off the switch.

6. The electronic device as claimed in claim 4, wherein when the counting result is equal to the setting value, the comparator is configured to provide the control signal to the switch to turn on the switch.

7. The electronic device as claimed in claim 1, wherein when the switch of the start-up circuit is turned on by the control signal, the electronic device is configured to perform an initialization operation, and to enter a power-saving mode after completing the initialization operation.

8. A power supply system, comprising:
a first electronic device;
a power line, transmitting a power supply from the first electronic device; and
a plurality of second electronic devices coupled to the first electronic device through the power line, wherein each of the second electronic devices comprises:
a power pin coupled to the power line, receiving the power supply;
a main circuit, comprising:
a functional circuit; and
a voltage regulator, providing at least one fixed voltage to power the functional circuit; and
a start-up circuit, comprising:
a switch coupled between the power pin and the voltage regulator; and
a timer counting a start-up time;
wherein when the timer counts to the start-up time, the timer is configured to provide a control signal to the switch to turn on the switch, so that the voltage regulator is configured to provide the at least one fixed voltage according to the power supply of the power supply line,
wherein once the power supply is received by the power pin and the timer is powered by the power supply, the switch is turned off until the timer has counted to the start-up time,
wherein a respective start-up time for a corresponding one of the second electronic devices is unique and is determined by a distance between the corresponding one of the second electronic devices and the first electronic device.

9. The power supply system as claimed in claim 8, further comprising:
a plurality of impedance devices respectively coupled to the second electronic devices, wherein each of the second electronic devices further comprises:
a first pin; and
a second pin, wherein the timer of the start-up circuit is coupled in parallel with a corresponding one of the plurality of impedance devices through the first pin and the second pin.

10. The power supply system as claimed in claim 9, wherein the start-up circuit further comprises:
an oscillator coupled in parallel to the corresponding one of the plurality of impedance devices, providing a periodic signal according to an impedance of the corresponding one of the plurality of impedance devices;
a counter, receiving the periodic signal and counting to obtain a counting result based on the periodic signal; and
a comparator, comparing the counting result with a setting value corresponding to the start-up time to provide the control signal.

11. The power supply system as claimed in claim 10, wherein when the impedance devices have different impedances, the second electronic devices have the same setting value.

12. The power supply system as claimed in claim 10, wherein when the impedance devices have the same impedance, the second electronic devices have different setting values.

13. The power supply system as claimed in claim 8, wherein when the switch of the start-up circuit is turned on by the control signal, a second electronic device corresponding to the switch is configured to perform an initialization operation, and to enter a power-saving mode after completing the initialization operation.

14. The power supply system as claimed in claim 8, further comprising:
a signal line, transmitting data between the first electronic device and the second electronic devices.

* * * * *